Nov. 18, 1969          H. E. TRACY          3,479,040

MECHANICAL SEAL CONSTRUCTION

Original Filed July 6, 1965          2 Sheets-Sheet 2

HERBERT E. TRACY
INVENTOR.

BY John O. Evans, Jr.

ATTORNEY

United States Patent Office 3,479,040
Patented Nov. 18, 1969

3,479,040
MECHANICAL SEAL CONSTRUCTION
Herbert E. Tracy, Alhambra, Calif., assignor to Borg-Warner Corporation, Chicago, Ill., a corporation of Illinois
Original application July 6, 1965, Ser. No. 469,700. Divided and this application July 18, 1967, Ser. No. 662,246
Int. Cl. F16j 15/34, 15/54
U.S. Cl. 277—81                              2 Claims

ABSTRACT OF THE DISCLOSURE

A mechanical seal assembly having a sealing ring carried by a shaft and being rotatable relative to a stationary sealing ring supported against a backing ring sealed to a portion of the housing by a bellows. The assembly includes: (1) means for locking the stationary sealing ring and the backing ring to the housing, (2) means for lubricating the opposed sealing faces of the rotary and stationary sealing rings, and (3) means for varying the force with which the stationary sealing ring is pressed toward the rotary sealing ring.

---

This application is a division of my copending application Ser. No. 469,700, filed July 6, 1965, for "Mechanical Seal Construction."

This invention relates to mechanical seals.

In conventional centrifugal pumps, the impeller shaft extends through an opening in the pump housing and is rotated by a motor external to the housing. A mechanical seal may be employed for rotatably sealing the shaft to the housing to prevent the flow of fluid from the housing outwardly through the space between the shaft and the shaft opening. Such a mechanical seal has a rotary sealing ring or element fixed to and sealed to the shaft for rotation with the latter. A stationary or non-rotary sealing ring has a radial sealing face opposed to a cooperating radial sealing face on the rotary sealing ring. The stationary sealing ring is sealed to the housing. One of the sealing rings is movable axially with respect to the shaft and is biased by spring means or the like into sealing relationship with the other ring. In operation, the liquid within the pump housing, which is under high pressure, flows at a low rate from the interior of the housing outwardly between the opposed sealing faces of the sealing rings to form a thin film of liquid between the sealing faces. This film of liquid lubricates and cools the sealing faces. During periods when the pump is not operating, the thin film of liquid may be lost from between the sealing faces, leaving the latter in direct contact with each other with no lubricating liquid between them. When the pump is started under these conditions, the sealing faces rub against each other in a dry state for the first few revolutions of the shaft, causing undue wear of the faces.

It is an object of this invention to provide a mechanical seal wherein lubricating fluid can be introduced between the sealing faces prior to start-up of a device embodying the seal.

Mechanical seal arangements have employed a metal bellows to seal a non-rotary sealing ring to a housing. The metal bellows is under axial compression between the sealing ring and the housing and serves to preload the sealing ring and press it into sealing relationship with a complementary rotary sealing ring. Relative rotation of the sealing rings exerts a torque which twists the bellows, distorting it and affecting the force with which it presses the fixed sealing ring towards the rotary sealing ring.

Thus another object of the invention is to provide a mechanical seal having a bellows as aforesaid and wherein the undesirable torque referred to is counteracted.

In mechanical seals employing bellows, normal wear of the sealing surfaces of the sealing rings, manufacturing tolerances, end-play of the shaft, and the like, cause variations in the position of the non-rotary sealing ring with respect to the housing and corresponding variations in the length of the bellows, thus varying the axial force exerted by the bellows on the non-rotary sealing ring.

Therefore, it is a further object of this invention to provide a mechanical seal wherein the bellows may be adjusted to compensate for the variations referred to.

Briefly stated, a mechanical seal in accordance with the present invention includes a non-rotary sealing ring and a rotary sealing ring, these rings having generally transverse, opposed, cooperating sealing faces, means for urging the rings toward each other, and means for injecting a lubricating fluid into the zone between the sealing faces.

The mechanical seal of the present invention may also include a backing ring having a radial face, a sealing ring having a radial face in sealing engagement with the radial face of the backing ring, a mounting ring encircling the backing ring and the sealing ring for preventing relative transverse movement of the rings, a housing portion surrounding the rings and spaced therefrom, and interlocking key means on said housing and on one of said rings for preventing relative rotation of the rings with respect to the housing portion.

The mechanical seal of the invention also includes a housing having a shaft opening therethrough, a shaft rotatable in the opening and spaced from its walls, a rotary sealing ring sealingly fixed to the shaft, an axially movable, non-rotary sealing ring, the sealing rings having opposed, relatively rotatable sealing faces, a bellows sealed to the axially movable sealing ring and to the housing for sealing the latter ring to the housing, and means for varying the axial force exerted by said bellows on the non-rotary sealing ring.

The invention will be described with greater particularity, and other of its aims, objects, and advantages will be apparent from or set forth in the following detailed description of one embodiment of the invention taken with the accompanying drawings in which.

Figure 1:
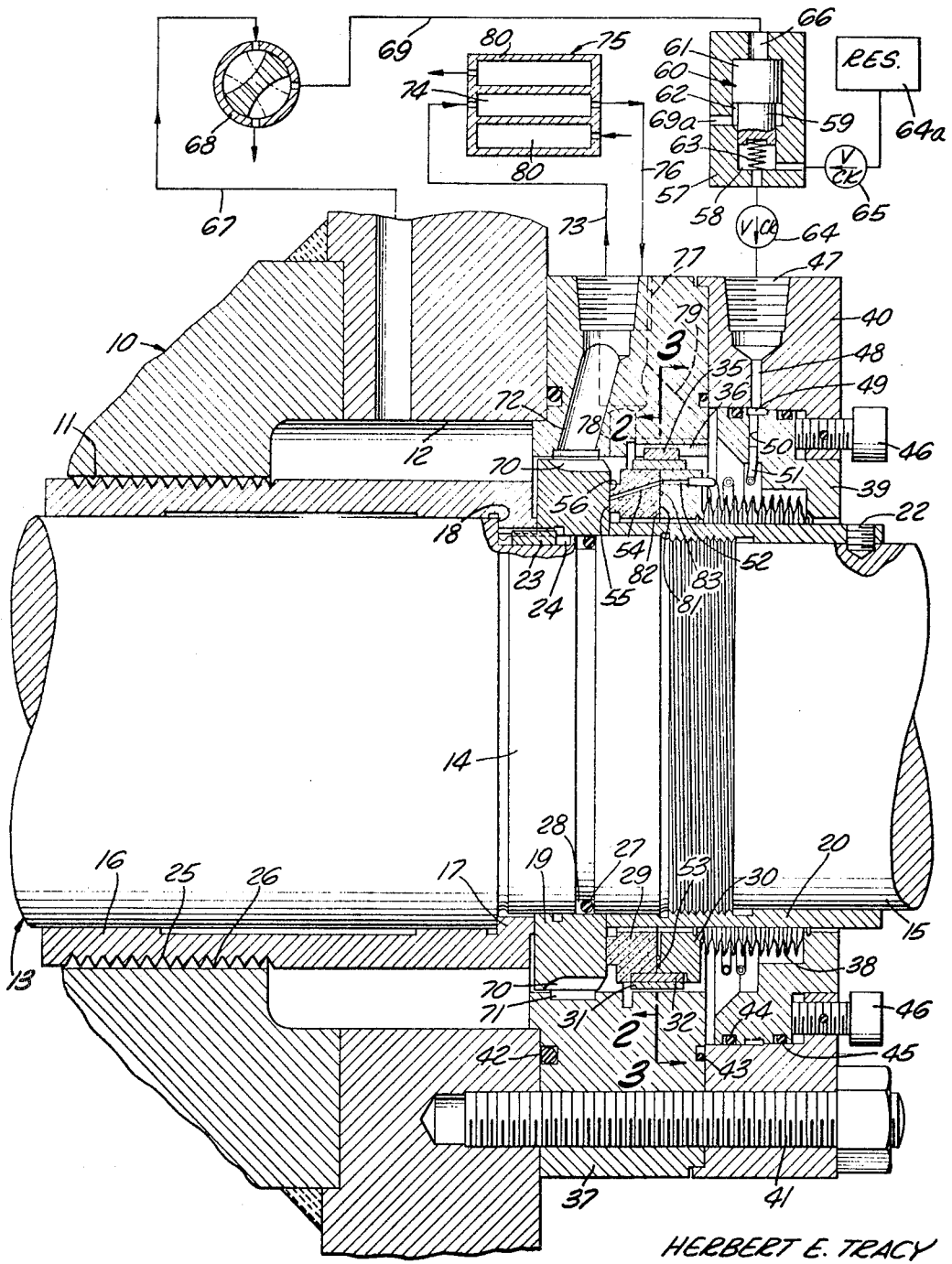
FIG. 1 is an axial sectional view of a portion of a pump housing showing an illustrative mechanical seal in accordance with the invention together with associated equipment, this view being taken along the line 1—1 of FIG. 2 or FIG. 3 looking in the direction of the arrows.

Referring to the drawings, the reference numeral 10 designates generally a housing, such as a centrifugal pump housing, having a shaft opening extending therethrough, the opening including a restricted bore 11 and an enlarged bore 12. A shaft 13 extends through the opening in the housing. A centrifugal pump impeller (not shown) may be mounted on the left-hand end of the shaft as seen in FIG. 1, and a driver (not shown), such as an electric motor, may be drivingly connected to the right-hand end of the shaft.

The shaft has a reduced portion 14 and a still further reduced portion 15. A sleeve 16, having an inturned flange 17, is mounted on the shaft with the flange 17 in abutment with a shoulder 18 on the shaft. A rotary sealing ring 19 is mounted on the reduced shaft portion 14 with the inner face of the sealing ring in abutment with the flange 17 of the shaft sleeve. A nut 20 is threaded to the shaft by threads 21 and is screwed into engagement with the outer face of the sealing ring 19 to retain the latter in place by clamping it between the flange 17 and the retaining nut. The retaining nut is secured against becoming loose by a set screw 22. The shaft sleeve 16 and the rotary sealing ring 19 are prevented from rotating with respect to the shaft by a key 23 received in a keyway 24 in the shaft and in the complementary opposed keyways in the flange 17 of the shaft sleeve and in the rotary sealing ring.

The shaft sleeve 16 is provided with a plurality of parallel, circumferential grooves 25 forming V-shaped ridges 26. The outer peripheries of these ridges lie adjacent to the restricted bore 11 of the housing, and form with the bore a labyrinth seal that restricts or limits outward flow of fluid from the interior of the housing 10, through the clearance between the shaft sleeve 16 and the restricted bore 11, and into the enlarged bore 12.

In a groove 28 in the reduced portion 14 of the shaft is an O-ring 27 for preventing flow of fluid outwardly along the shaft and between the rotary sealing ring 19 and the reduced portion of the shaft.

The shaft 13 is journaled in suitable bearings (not shown), as is conventional.

Figure 2:
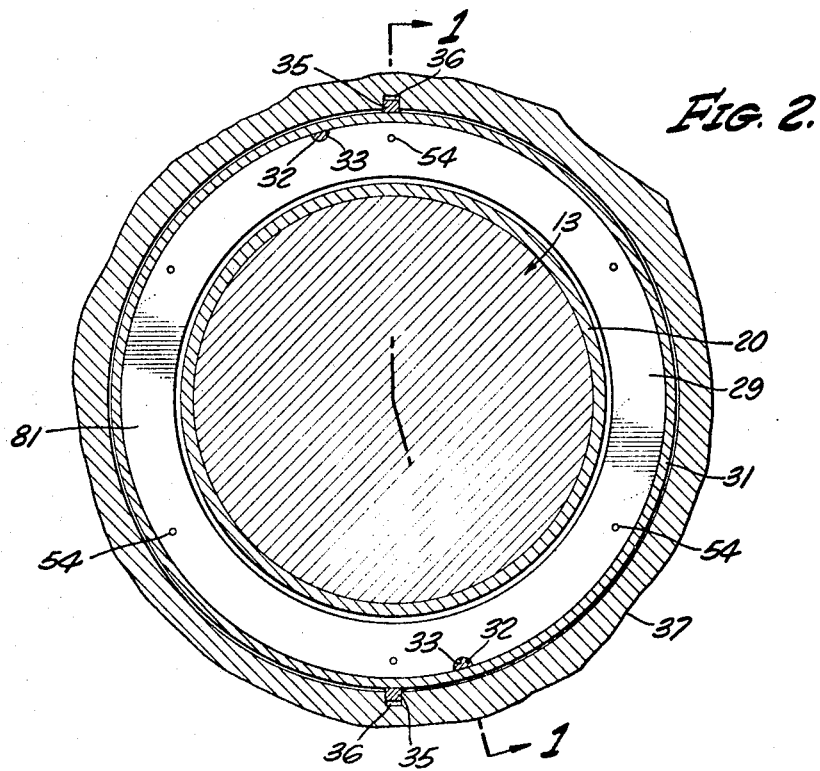
FIG. 2 is a transverse sectional view taken along the section line of FIG. 1 looking in the direction of the arrows 2—2.
Figure 3:
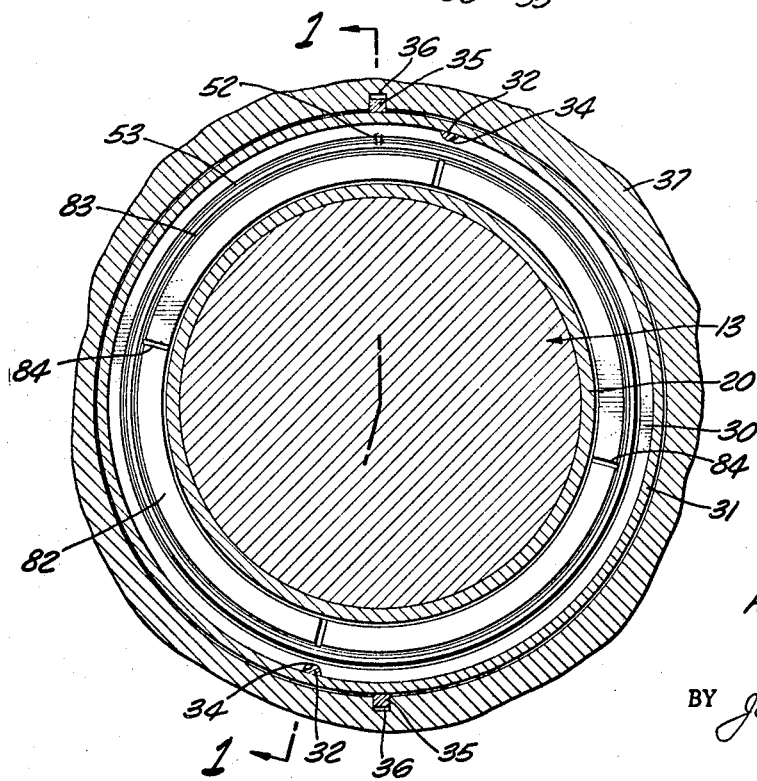
FIG. 3 is a transverse sectional view taken along the same section line of FIG. 1 looking in the direction of the arrows 3—3.

A stationary or non-rotary sealing ring 29 is arranged in sealing relation to the rotary sealing ring 19. The fixed sealing ring is mounted upon a backing ring 30 by means of a mounting ring 31 that encircles both the stationary sealing ring and the backing ring. As best seen in FIGS. 2 and 3, the mounting ring 31 has a pair of diametrically disposed, axially arranged keys 32 that are received in slots 33 in the fixed sealing ring 29 and aligned slots 34 in the backing ring 30. Extending radially outwardly from the mounting ring 31 is a pair of keys 35 that are diametrically disposed and that are received in keyways 36 in a flange 37. With this construction, the fixed sealing ring 29 is securely mounted upon the backing ring 30 by the mounting ring 31. The keys 32 prevent relative rotation between the fixed sealing ring and its backing ring and mounting ring. The keys 35 prevent relative rotation of the ring assembly with respect to the flange 37.

One end of a metallic bellows 38 is welded to the outer face of the backing ring 30. The other end of the bellows is welded to a bellows adapter 39. The bellows adapter is received within an auxiliary flange 40 which, in turn, is mounted upon the flange 37. Bolts, such as 41, secure the flange 37 and auxiliary flange 40 to the housing 10. Leakage between the housing 10 and the flange 37 is prevented by an O-ring 42, and leakage between the flange 37 and the auxiliary flange 40 is prevented by another O-ring 43. O-rings 44 and 45 prevent loss of fluid between the auxiliary flange 40 and the bellows adapter 39.

The bellows adapter 39 is axially slidable in the auxiliary flange 40. Adjusting screws 46, 46 are employed to set the bellows adapter at a selected axial position for attaining the desired compression of the bellows 38. Thereby, the non-rotary sealing ring 29 may be preloaded with a desired force to urge it against the rotary sealing ring 19.

Provision is made for injecting lubricating fluid between the opposed sealing faces of the sealing rings 19 and 29. For this purpose, a tapped hole 47 is provided in the periphery of the auxiliary flange 40. Lubricating fluid is conducted from the bottom of this hole through a bore 48 to an annular slot 49 in the periphery of the bellows flange 39. Another bore 50 leads radially inward through the bellows adapter from the slot 49. One end of a continuous length of flexible metal tubing 51 is sealed into the inner end of the bore 50. The metal tubing is coiled about the bellows 38, the other end of the tubing being sealed into an axial bore 52 that extends through the backing ring 30. As best seen in FIG. 3, the inner end of the bore 52 opens into an annular slot 53 formed in the backing ring 30. There is a plurality of longitudinal bores 54 extending through the non-rotary sealing ring 29. Six such bores are appropriate, and this number is shown in FIG. 2 of the drawings. Each of these bores 54 communicates at one end with the annular groove 53 in the backing ring and opens at the other end into the sealing face 55 of the non-rotary sealing ring. Thus, when lubricating fluid under pressure is introduced into the tapped hole 47, it can flow through the bore 48, the groove 49, the bore 50, the flexible metal tubing 51, and into the bore 52 in the backing ring. The lubricating fluid then flows through the bore 52 into the annular groove 53 in the backing ring and thence through the bores 54 into the space between the sealing face 55 of the non-rotary sealing ring and the sealing face 56 of the rotary sealing ring 19.

A typical device for supplying lubricant to the tapped hole 47 includes a cylinder 57 having a bore 58 into which one end 59 of a double-headed piston 60 is slidably fitted. The other end 61 of the piston is of larger diameter than said one end and is slidably fitted in a bore 62. The piston 60 is normally held in its upper position, as illustrated, by a spring 63. The bore 58 of the cylinder is placed in communication with the tapped hole 47 through a check valve 64. A lubricant reservoir 64a communicates with the lower bore 58 of the cylinder through another check valve 65.

In the upper end of the cylinder 57, there is formed a port 66 through which fluid for actuating the piston is admitted. Fluid for operating the piston may be obtained conveniently from the enlarged bore 12 in the housing 10. For this purpose, a conduit 67 leads from the bore 12 to a three-way valve 68. In the dotted line position of the valve, fluid will flow from the conduit 67 through a conduit 69 to the port 66 of the cylinder. When the valve is in the full line position, operating fluid is exhausted from the upper end of the cylinder through the port 66 and the conduit 69. It will be noted that the cylinder 57 has a vent 69a that prevents air being trapped in the cylinder bore 62 below the piston portion 61.

It is believed that the operation of the device for injecting lubricant between the sealing faces of the mechanical seal rings will be obvious from the foregoing description. In brief, however, when the piston 61 is moved to the illustrated position from a depressed position, lubricating fluid is drawn from the reservoir 64a into the bore 58 through the check valve 65. When the piston is depressed, this lubricating fluid is forced through the check valve 64 into the tapped inlet 47 and thence to the space between the sealing faces 55 and 56 through the channels hereinbefore described.

Movement of the piston 60 downwardly to accomplish this result is under control of the valve 68. When the valve is turned to the dotted line position, pressure fluid from the enlarged bore 12 is admitted to the cylinder above the piston end 61 to force it downwardly. Then, when the valve is turned to the full line position, the spring 63 returns the piston 60 to its upper position to draw another charge of lubricant fluid into the bore 58.

The mechanical seal shown and described herein includes apparatus for cooling the seal. This apparatus forms no essential part of the present invention. For a fuller description of cooling apparatus of this type, reference is made to U.S. Patent No. 2,824,759, issued Feb. 25, 1958, Herbert E. Tracy, for Liquid Cooled Seal, which patent is assigned to the assignee of the present application. The cooling device includes pump vanes 70 formed in the periphery of the rotary sealing ring 19. As the shaft is turned, these vanes impel fluid from around the sealing rings into an annular channel 71 provided in the flange 37 adjacent to the pump vanes. From this annular channel, fluid is forced outwardly through a bore 72 in the flange and through a conduit 73 to the central section 74 of a heat exchanger 75. Cooled fluid from the central section 74 flows through a conduit 76 to a cool-fluid inlet 77 in the flange 37. The cool fluid is returned to the vicinity of the sealing rings through the conduits 78 and 79. After cooling the sealing rings and adjacent parts, the fluid is recirculated by the pump vanes 70 through the heat exchanger 75. The heat exchanger has an outer section 80, 80 through which a cooling fluid is circulated in indirect heat-exchange relation with the fluid that flows through the central section 74 of the heat exchanger.

The surface 81 of the non-rotary sealing ring 29 that is in contact with the surface 82 of the backing ring 30 is lapped, as is also the surface 82, to provide with the latter a fluid-tight joint. As best seen in FIGS. 1 and 3, this joint includes an annular groove 83 formed in the surface 82 of the backing ring, which annular groove is connected by a plurality of radial grooves 84 with the inner periphery of the backing ring. The annular groove 83 is in communication with the outer atmosphere through the radial grooves 84 and the interior of the bellows 38. By this means, the resultant force exerted by fluid pressure inside the housing that presses the backing ring into fluid-tight contact with the non-rotary sealing ring is concentrated in an annular zone that lies between the annular groove 83 and the outer peripheries of the non-rotary sealing ring 29 and the backing ring 30. Thereby, an improved sealing relation is established between the backing ring and the non-rotary sealing ring. This joint forms no essential part of the present invention. For a fuller description of this type of joint, reference is made to the co-pending application of Winfred J. Wiese, for Mechanical Seal, filed Oct. 14, 1964, under Ser. No. 405,022, which co-pending application is a continuation of U.S. application, Ser. No. 83,476, entitled Mechanical Seal, which application was filed Jan. 18, 1961, in the name of Winfred J. Wiese. Both of said applications are assigned to the assignee of the present application.

Various changes may be made in the form of the invention herein disclosed by way of example without departing from the terms and concepts of the invention. Such changes will be apparent to those skilled in the art and are intended to be within the scope of the following claims.

I claim:

1. A mechanical seal assembly for sealing a rotary shaft (13) to a housing (10) having an opening through which the shaft (13) extends comprising a rotary sealing ring (19) fixed to the shaft (13), a non-rotary sealing ring (29) carried by the housing (10), said sealing rings (19, 29) having opposed sealing faces (56, 55) arranged in relative rotational sealing relation to each other, a backing ring (30) positioned on the opposite side of said non-rotary sealing ring (29) from said rotary sealing ring (19), radially extending surfaces (81, 82) on said non-rotary sealing ring (29) and on said backing ring (30), said surfaces (81, 82) being in relative non-rotational fluid-tight engagement with each other, a mounting ring (31) encircling and engaging said non-rotary sealing ring (29) and said backing ring (30) for preventing relative transverse movement therebetween, an axially extending key (32) carried by said mounting ring (31) and engaged in slot means (33, 34) in said non-rotary sealing ring (29) and in said backing ring (30) for preventing relative rotation therebetween, said mounting ring (31), said non-rotary sealing ring (29), and said backing ring (30) being movable as a unit axially of the shaft (13), spring means (38) biasing said backing ring (30) towards said rotary sealing ring (19), and another axially extending key (35) carried by said mounting ring (31) and engaged in slot means (36) in the housing (10) for preventing rotation of said mounting ring (31) with respect to the housing (10).

2. A mechanical seal assembly as defined in claim 1 wherein said spring means (38) comprises a metallic bellows having one end sealed to said backing ring (30) and the other end sealed to said housing (10).

References Cited

UNITED STATES PATENTS

| 3,061,319 | 10/1962 | Snyder | 277—92 |
| 3,288,474 | 11/1966 | Gits | 277—88 |
| 3,356,378 | 12/1967 | Tracy | 277—88 X |

FOREIGN PATENTS

| 593,842 | 3/1960 | Canada. |
| 433,201 | 12/1911 | France. |

LAVERNE D. GEIGER, Primary Examiner

JEFFREY S. MEDNICK, Assistant Examiner

U.S. Cl. X.R.

277—75, 88, 136, 188